(12) United States Patent
Kuramochi et al.

(10) Patent No.: US 11,069,467 B2
(45) Date of Patent: Jul. 20, 2021

(54) SOLENOID DEVICE

(71) Applicant: NIDEC TOSOK CORPORATION, Kanagawa (JP)

(72) Inventors: Kenta Kuramochi, Kanagawa (JP); Weiming Chen, Kanagawa (JP); Tomohiro Yasuda, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 258 days.

(21) Appl. No.: 16/441,011

(22) Filed: Jun. 14, 2019

(65) Prior Publication Data

US 2020/0005979 A1 Jan. 2, 2020

(30) Foreign Application Priority Data

Jun. 28, 2018 (JP) .............................. JP2018-123010

(51) Int. Cl.

| *H01F 3/00* | (2006.01) |
|---|---|
| *H01F 7/08* | (2006.01) |
| *H01F 7/128* | (2006.01) |
| *F16K 31/06* | (2006.01) |
| *H01F 7/16* | (2006.01) |

(52) U.S. Cl.
CPC ......... *H01F 7/081* (2013.01); *F16K 31/0613* (2013.01); *H01F 7/128* (2013.01); *H01F 7/16* (2013.01); *H01F 2007/086* (2013.01)

(58) Field of Classification Search
CPC . H01F 7/081; H01F 7/128; H01F 7/16; H01F 2007/086; F16K 11/07; F16K 31/0613; F16K 27/048

USPC ......................................................... 335/255
See application file for complete search history.

(56) References Cited

U.S. PATENT DOCUMENTS

| 1,439,693 | A | * | 12/1922 | Coates | ................. | H01H 71/443 |
|---|---|---|---|---|---|---|
| | | | | | | 335/106 |
| 1,955,201 | A | * | 4/1934 | Nette | ..................... | H01H 51/08 |
| | | | | | | 335/188 |
| 2,199,178 | A | * | 4/1940 | Hurlburt | ............... | H01F 7/1607 |
| | | | | | | 335/255 |
| 2,468,852 | A | * | 5/1949 | Wallace | ................. | H01H 75/04 |
| | | | | | | 335/255 |
| 2,892,134 | A | * | 6/1959 | Kruithof | ................ | H01H 50/20 |
| | | | | | | 335/255 |

(Continued)

FOREIGN PATENT DOCUMENTS

JP 2017166570 9/2017

*Primary Examiner* — Shawki S Ismail
*Assistant Examiner* — Lisa N Homza
(74) *Attorney, Agent, or Firm* — JCIPRNET (57) ABSTRACT

A solenoid device includes a yoke, a core, a shaft, a bobbin, a coil, a plunger, a lid, and a housing. A housing body part of the housing has a first opening that opens on the rear side; and a first inner wall part expanding in a cylindrical shape on the outer side in the radial direction on an inner wall on the rear side. The first inner wall part has a first step part at the end on the other side in the axial direction. A first cylindrical part of the yoke has a first flange part on the rear side. The first flange part has a hole penetrating in the axial direction. A second space, which communicates a second through hole with the hole when the plunger has moved to a retreat position, is provided between an inner surface of the lid and the plunger and the yoke.

11 Claims, 4 Drawing Sheets

(56) References Cited

U.S. PATENT DOCUMENTS

| | | | | |
|---|---|---|---|---|
| 2,907,983 A * | 10/1959 | Boswan | H03K 23/74 | 377/90 |
| 2,931,617 A * | 4/1960 | Jamieson | F16K 31/105 | 251/54 |
| 3,005,890 A * | 10/1961 | White | H01H 50/20 | 335/131 |
| 3,041,423 A * | 6/1962 | Weber | H01H 50/546 | 335/127 |
| 3,054,872 A * | 9/1962 | Clark | H01H 50/22 | 335/131 |
| 3,130,282 A * | 4/1964 | Hanaway | H01H 50/20 | 335/126 |
| 3,141,171 A * | 7/1964 | Doyle | B25C 1/06 | 227/2 |
| 3,156,797 A * | 11/1964 | Smith | H01H 50/30 | 335/121 |
| 3,209,096 A * | 9/1965 | Forburger | H01H 51/06 | 335/131 |
| 3,588,770 A * | 6/1971 | Higuma | H01F 7/1607 | 335/255 |
| 3,633,139 A * | 1/1972 | Thompson | H01F 7/1607 | 335/255 |
| 3,838,370 A * | 9/1974 | Ueno | H01F 7/1607 | 335/255 |
| 3,909,758 A * | 9/1975 | Hans | F16K 31/0675 | 335/255 |
| 4,156,220 A * | 5/1979 | Mazzorana | H01H 51/065 | 335/255 |
| 4,166,991 A * | 9/1979 | Haner | H01F 7/13 | 335/255 |
| 4,251,788 A * | 2/1981 | Barthruff | H01H 51/065 | 335/131 |
| 4,322,057 A * | 3/1982 | Yamanaka | F16K 31/0606 | 137/625.65 |
| 4,326,696 A * | 4/1982 | Ishikawa | F16K 31/0606 | 137/625.65 |
| 4,404,533 A * | 9/1983 | Kurihara | H01H 51/065 | 335/126 |
| 4,419,643 A * | 12/1983 | Ojima | H01F 7/1615 | 335/230 |
| 4,442,998 A * | 4/1984 | Ohyama | F16K 11/044 | 137/625.5 |
| 4,494,098 A * | 1/1985 | Haneda | H01F 7/1615 | 335/230 |
| 4,558,293 A * | 12/1985 | Haneda | H01F 7/1615 | 310/30 |
| 4,604,597 A * | 8/1986 | Bogner | H01H 51/065 | 335/127 |
| 4,649,360 A * | 3/1987 | Riefler | H01F 7/1607 | 335/255 |
| 4,683,454 A * | 7/1987 | Vollmer | H01F 7/1607 | 251/129.15 |
| 4,797,645 A * | 1/1989 | Uetsuhara | H01F 7/1646 | 335/230 |
| 4,881,416 A * | 11/1989 | Isozumi | F02N 11/00 | 74/7 A |
| 4,994,776 A * | 2/1991 | Juncu | H01F 7/1615 | 335/230 |
| 5,303,012 A * | 4/1994 | Horlacher | H01F 7/1615 | 335/234 |
| 5,546,061 A * | 8/1996 | Okabayashi | H01H 9/443 | 335/126 |
| 5,892,422 A * | 4/1999 | Montaigu | H01H 51/065 | 335/126 |
| 5,901,604 A * | 5/1999 | Sato | F02N 15/066 | 74/7 A |
| 5,909,067 A * | 6/1999 | Liadakis | H01H 51/065 | 310/14 |
| 5,986,528 A * | 11/1999 | Meier | H01H 1/54 | 335/129 |
| 6,049,263 A * | 4/2000 | Vilou | H01H 51/065 | 290/38 R |
| 6,076,550 A * | 6/2000 | Hiraishi | F16K 31/0655 | 137/550 |
| 6,337,614 B1 * | 1/2002 | Tsutsui | H01H 50/02 | 335/160 |
| 6,409,144 B1 * | 6/2002 | Inami | H01F 7/081 | 251/129.15 |
| 6,619,616 B1 * | 9/2003 | Sudani | F16K 31/0637 | 137/596.17 |
| 6,621,394 B2 * | 9/2003 | Ono | H01H 50/042 | 335/159 |
| 6,720,853 B1 * | 4/2004 | Callis | F16K 31/0644 | 335/255 |
| 7,009,475 B2 * | 3/2006 | Niimi | F02N 15/067 | 335/126 |
| 7,157,996 B2 * | 1/2007 | Enomoto | H01H 50/02 | 335/126 |
| 7,199,687 B2 * | 4/2007 | Maruhashi | F02N 15/063 | 335/131 |
| 7,570,138 B2 * | 8/2009 | Hirabayashi | F02N 11/00 | 307/10.6 |
| 7,692,522 B2 * | 4/2010 | Hartinger | H01H 1/0015 | 335/131 |
| 7,772,944 B2 * | 8/2010 | Kurasawa | F02N 11/00 | 335/126 |
| 7,911,301 B2 * | 3/2011 | Yano | H01H 50/443 | 335/131 |
| 7,911,304 B2 * | 3/2011 | Yano | H01H 50/043 | 335/201 |
| 7,978,035 B2 * | 7/2011 | Usami | H01F 3/02 | 335/131 |
| 8,143,979 B2 * | 3/2012 | Usami | H01H 51/065 | 335/131 |
| 8,193,882 B2 * | 6/2012 | Murata | H01F 7/088 | 335/126 |
| 8,228,144 B2 * | 7/2012 | Sugisawa | H01H 1/54 | 335/78 |
| 8,237,524 B2 * | 8/2012 | Niimi | F02N 15/067 | 335/177 |
| 8,289,110 B2 * | 10/2012 | Niimi | H01H 51/065 | 335/126 |
| 8,350,652 B2 * | 1/2013 | Hoppe | F01L 1/3442 | 335/262 |
| 8,446,239 B2 * | 5/2013 | Niimi | H01H 50/22 | 335/126 |
| 8,514,037 B2 * | 8/2013 | Hsu | H01H 50/643 | 335/125 |
| 8,777,180 B2 * | 7/2014 | Doerr | F16K 31/0682 | 251/129.09 |
| 8,853,585 B2 * | 10/2014 | Tachikawa | H01H 50/546 | 218/26 |
| 8,957,749 B2 * | 2/2015 | Matsumoto | H01F 7/1638 | 335/282 |
| 2002/0158727 A1 * | 10/2002 | Namen | E05B 47/026 | 335/78 |
| 2005/0057332 A1 * | 3/2005 | Nakamura | H01H 50/042 | 335/128 |
| 2006/0181378 A1 * | 8/2006 | Ryuen | F16K 31/0631 | 335/78 |
| 2006/0181380 A1 * | 8/2006 | Nakamura | H01H 50/646 | 335/132 |
| 2007/0194868 A1 * | 8/2007 | Kurasawa | H01H 51/065 | 335/132 |
| 2009/0039992 A1 * | 2/2009 | Ryuen | H01F 7/081 | 335/255 |
| 2009/0121817 A1 * | 5/2009 | Ishibashi | F16K 31/0613 | 335/255 |
| 2009/0140189 A1 * | 6/2009 | Kokubu | F16K 31/0613 | 251/129.15 |
| 2010/0147390 A1 * | 6/2010 | Glaudel | F16K 31/0696 | 137/1 |
| 2010/0301978 A1 * | 12/2010 | Ishibashi | H01F 7/1607 | 335/255 |
| 2011/0115587 A1 * | 5/2011 | Ishibashi | H01F 7/081 | 335/255 |
| 2014/0225690 A1 * | 8/2014 | Ando | H01F 7/127 | 335/255 |

(56) References Cited

U.S. PATENT DOCUMENTS

| | | | | |
|---|---|---|---|---|
| 2014/0311435 | A1* | 10/2014 | Hirabayashi | F02N 11/087 123/179.25 |
| 2015/0129785 | A1* | 5/2015 | Kai | F16K 31/0631 251/65 |
| 2015/0279538 | A1* | 10/2015 | Toda | H01F 7/081 475/31 |
| 2015/0380143 | A1* | 12/2015 | Saiki | H01F 7/081 335/255 |
| 2017/0159844 | A1* | 6/2017 | Fujita | F16K 31/082 |
| 2019/0293202 | A1* | 9/2019 | Murata | F16K 31/06 |
| 2020/0005978 | A1* | 1/2020 | Kuramochi | F16K 31/0613 |
| 2020/0005979 | A1* | 1/2020 | Kuramochi | F16K 11/07 |
| 2020/0182210 | A1* | 6/2020 | Kodama | F02M 59/46 |

* cited by examiner

SOLENOID DEVICE

CROSS-REFERENCE TO RELATED APPLICATION

This application claims the priority benefit of Japan Application No. 2018-123010, filed on Jun. 28, 2018. The entirety of the above-mentioned patent application is hereby incorporated by reference herein and made a part of this specification.

BACKGROUND

Technical Field

The disclosure relates to a solenoid device.

Description of Related Art

A solenoid valve, in which a spool valve is provided in a solenoid having a shaft, is known as an example of the solenoid device. The solenoid of the solenoid valve described in Patent Document 1 includes a cylindrical yoke extending in the axial direction; a cylindrical core positioned on the other side in the axial direction with respect to the yoke and extending in the axial direction; a shaft moving in the core in the axial direction; a bobbin disposed on the outer side of the yoke and the core in the radial direction; a coil wound on the bobbin; a plunger moving in the yoke in the axial direction; and a housing that houses these members.

The plunger has a first through hole that penetrates in the axial direction. Inside the housing, when the plunger moves toward one side in the axial direction, a first space is created between the plunger and the core; and when the plunger moves toward the other side in the axial direction, a second space is created between the plunger and the cover plate. The first through hole allows the air in the first space to flow to the second space when the plunger moves toward one side in the axial direction. Moreover, the first through hole allows the air in the second space to flow to the first space when the plunger moves toward the other side in the axial direction. Therefore, even if the volumes of the first space and the second space change with the movement of the plunger in the axial direction, the pressure of the air in the first space and the second space is suppressed from changing for the plunger to move smoothly.

When the plunger described in Patent Document 1 moves toward one side in the axial direction, the second space gradually becomes narrow and the air in the second space flows into the first through hole, and when the end surface of the plunger on one side in the axial direction comes into surface contact with the inner surface of the cover plate, the movement of the plunger is stopped. However, because the first through hole is at a position that deviates toward one side in the radial direction with respect to the central axis, the air in the second space on the side away from the opening, which opens the first through hole on the side of the cover plate, may not easily flow into the first through hole. As a result, the air in the second space is compressed as the plunger moves toward one side in the axial direction, and the air pressure increases. Due to the increased air pressure, the plunger may not move smoothly toward one side in the axial direction.

RELATED ART

Patent Document

[Patent Document 1] Japanese Laid-Open No. 2017-166570

SUMMARY

The disclosure provides a solenoid device that suppresses the influence of air pressure in the housing, which changes with the movement of the plunger in the axial direction, and allows the plunger to move smoothly.

A first exemplary embodiment of the disclosure is a solenoid device for moving a shaft in an axial direction with a magnetic force generated by excitation of a coil. The solenoid device includes: a yoke including a first cylindrical part that extends in the axial direction; a core positioned on the other side in the axial direction with respect to the yoke and including a second cylindrical part that extends in the axial direction; the shaft moving in the axial direction inside the second cylindrical part; a bobbin disposed on an outer side of the first cylindrical part and the second cylindrical part in a radial direction; the coil wound on the bobbin; a plunger moving in the axial direction inside the first cylindrical part; a lid positioned on one side in the axial direction with respect to the yoke and the plunger; and a housing housing the shaft, the yoke, the core, the bobbin, the coil, the plunger, and the lid. The housing includes a cylindrical housing body part, and the housing body part includes: a first opening that opens at an end on one side in the axial direction; and a first inner wall part that is adjacent to the first opening and expands in a cylindrical shape in the axial direction on the outer side in the radial direction on an inner wall of the housing body part on one side in the axial direction. The first inner wall part includes an annular first step part that extends in the radial direction at an end on the other side in the axial direction. The first cylindrical part of the yoke includes an annular first flange part that protrudes toward the outer side in the radial direction on one side of the first cylindrical part in the axial direction. The lid has a disk shape and includes an annular circumferential edge part that extends toward the outer side in the radial direction. The yoke and the lid are fixed to the housing in a state where a first end surface of the first flange part on the other side in the axial direction is in contact with the first step part of the housing body part, and a surface on the other side in the axial direction of the circumferential edge part of the lid is in contact with a first end surface of the first flange part on one side in the axial direction. The second cylindrical part of the core has a first space, which opens on one side in the axial direction and is recessed toward the other side in the axial direction for inserting or removing the plunger that moves. The plunger has a second through hole that penetrates along the axial direction. The second through hole has a third opening that opens on the other side of the second through hole in the axial direction and is positioned on the outer side in the radial direction with respect to the shaft, as viewed in the axial direction. The first flange part of the yoke has a hole that opens at least on one side in the axial direction and extends toward the other side in the axial direction. A second space, which communicates the second through hole with the hole when the plunger has moved to a retreat position in contact with the lid, is provided between an inner surface of the lid on the other side in the axial direction and the plunger and the yoke.

According to the first exemplary embodiment of the disclosure, it is possible to provide a solenoid device that suppresses the influence of air pressure in the housing, which changes with the movement of the plunger in the axial direction, and allows the plunger to move smoothly.

DESCRIPTION OF THE EMBODIMENTS

Hereinafter, a solenoid device according to an embodiment of the disclosure will be described with reference to the drawings. The present embodiment illustrates a solenoid device, in which a spool valve for outputting pressure-regulated oil is provided in a solenoid. Moreover, in order to make each configuration easily understandable, in the following drawings, the scale, number, etc. of each structure may be different from the actual structure.

In the drawings, an XYZ coordinate system is shown as a three-dimensional orthogonal coordinate system as appropriate. In the XYZ coordinate system, the Z axis direction is set as a direction parallel to the axial direction of the central axis J shown in FIG. 1. The X axis direction is set as a direction parallel to the lateral direction of the solenoid device shown in FIG. 1. The Y axis direction is set as a direction orthogonal to both the X axis direction and the Z axis direction.

In the following descriptions, the positive side of the Z axis direction (+Z side) is referred to as the "rear side" and the negative side of the Z axis direction (−Z side) is referred to as the "front side". Nevertheless, the rear side and the front side are names used merely for explanation and are not intended to limit the actual positional relationship or direction. In addition, unless otherwise noted, the direction (Z axis direction) parallel to the central axis J is simply referred to as the "axial direction", the radial direction centered on the central axis J is simply referred to as the "radial direction", and the circumferential direction centered on the central axis J, that is, the direction (θ direction) around the central axis J is simply referred to as the "circumferential direction".

In this specification, extension in the axial direction includes not only extension strictly in the axial direction (Z axis direction) but also extension in a direction inclined within a range of less than 45° with respect to the axial direction. In addition, in this specification, extension in the radial direction includes not only extension strictly in the radial direction, that is, a direction perpendicular to the axial direction (Z axis direction) but also extension in a direction inclined within a range of less than 45° with respect to the radial direction.

First Embodiment

Figure 1:
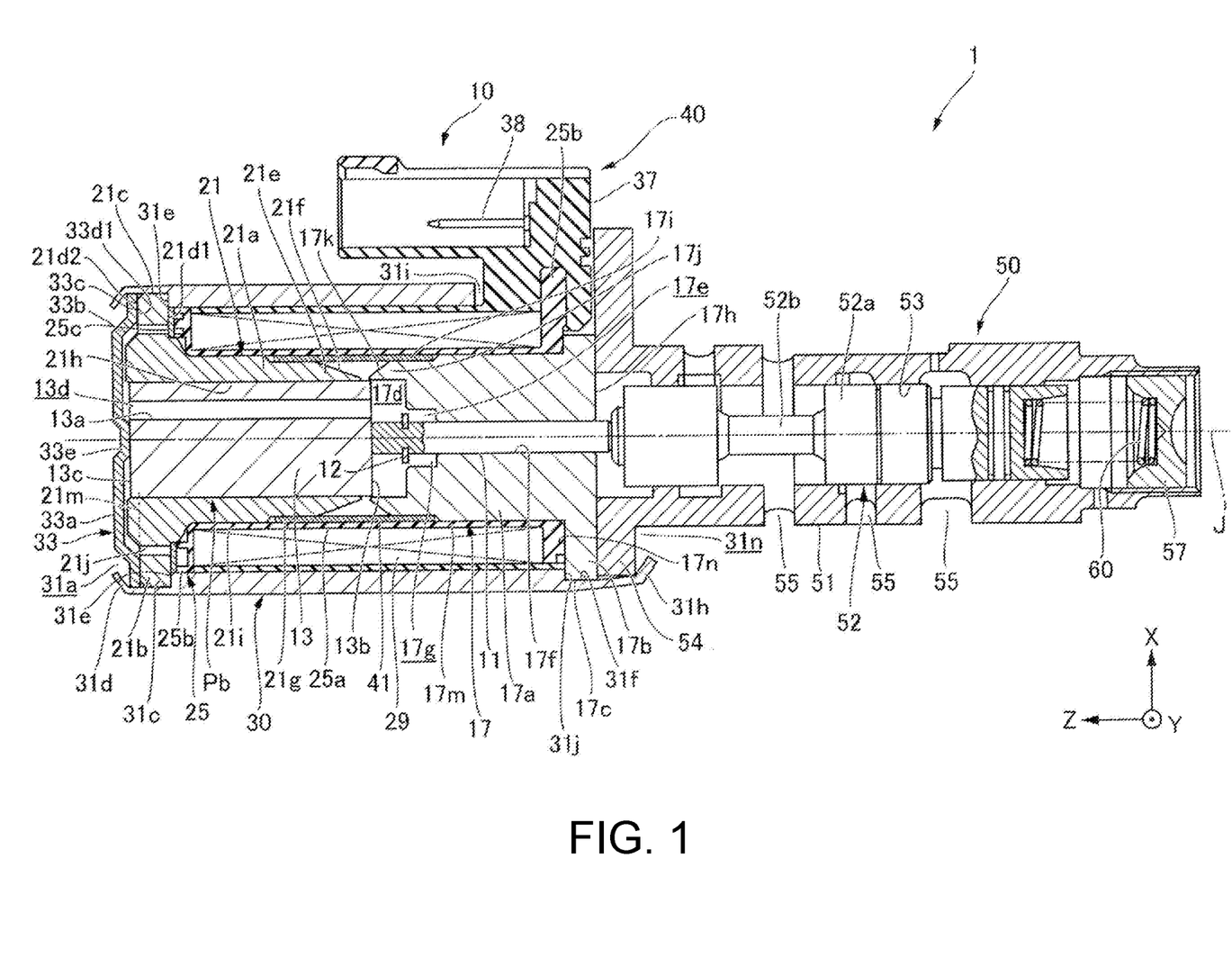
FIG. 1 is a cross-sectional view of the solenoid device according to the first embodiment.

<Overall Configuration>
FIG. 1 is a cross-sectional view of a solenoid device according to the first embodiment. As shown in FIG. 1, the solenoid device 1 of the present embodiment includes a solenoid 10 and a spool valve 50. The solenoid 10 and the spool valve 50 are disposed along the axial direction. The solenoid 10 moves a shaft 11 in the axial direction with a magnetic force generated by excitation of a coil 29. The spool valve 50 is positioned on the other side (front side) of the solenoid 10 in the axial direction and includes a spool valve portion 52 that is movable in the axial direction along with movement of the shaft 11. The spool valve portion 52 is movably housed inside a valve body 51. Each component will be described in detail hereinafter. Applying a current to the coil 29 to generate magnetic flux is referred to as "excitation of the coil 29".

Figure 2:
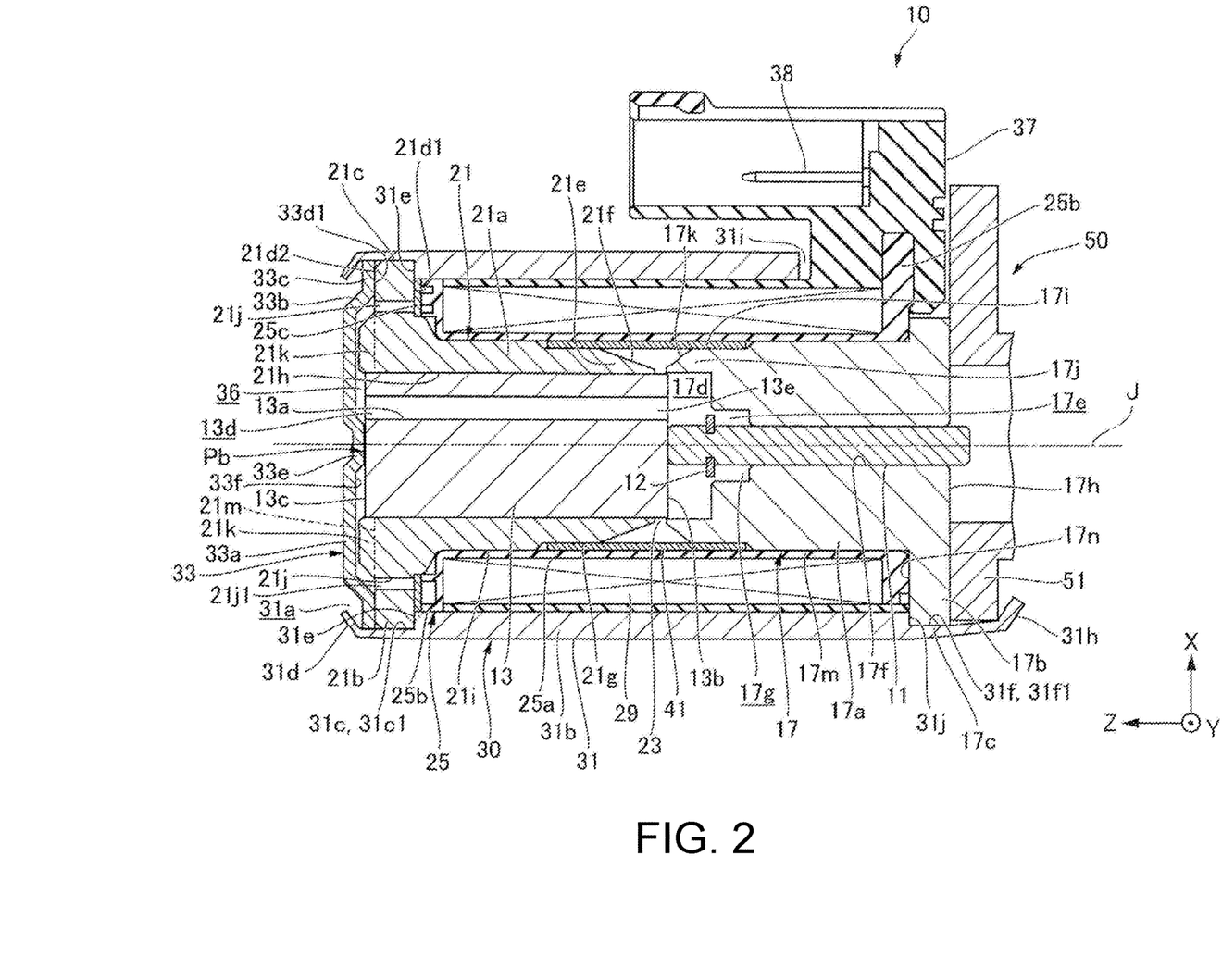
FIG. 2 is a cross-sectional view of the solenoid.

<Solenoid 10>
FIG. 2 is a cross-sectional view of the solenoid. As shown in FIG. 1 and FIG. 2, the solenoid 10 includes a yoke 21, a core 17, the shaft 11, a bobbin 25, the coil 29, a plunger 13, a lid 33, and a housing 30.

(Housing 30)
The housing 30 is made of a magnetic material and houses the shaft 11, the yoke 21, the core 17, the bobbin 25, the coil 29, the plunger 13, and the lid 33. The housing 30 has a cylindrical housing body part 31. In the present embodiment, the housing body part 31 has a cylindrical shape. The housing body part 31 has a first opening 31a, a first inner wall part 31c, and a first caulking part 31d. The first opening 31a opens at the end on one side in the axial direction. The first inner wall part 31c is adjacent to the first opening 31a and expands in a cylindrical shape in the axial direction on the outer side in the radial direction on an inner wall 31b of the housing body part 31 on one side in the axial direction. The first caulking part 31d extends from the end of the first inner wall part 31c on one side in the axial direction toward one side in the axial direction. The first inner wall part 31c has an annular first step part 31e that extends in the radial direction at the end on the other side in the axial direction.

In the present embodiment, the inner surface of the first inner wall part 31c is flush with the inner surface of the first caulking part 31d. In addition, the thickness of the first caulking part 31d in the radial direction is smaller than the thickness of the inner wall 31b of the housing body part 31 in the radial direction. The first step part 31e extends toward one side in the axial direction in a direction orthogonal to the axial direction. An end surface 21d1 of a first flange part 21b of the yoke 21 on the other side in the axial direction is in contact with the first step part 31e.

The first opening 31a opens on the inner side in the radial direction of a tip end in the axial direction of the first caulking part 31d. The first opening 31a has a circular shape, as viewed in the axial direction. The lid 33 is inserted on the front side of the first opening 31a. A circumferential edge part 33c of the lid 33 is in contact with the first end surface 21d2 of the first flange part 21b on one side in the axial direction.

The housing body part 31 has a second inner wall part 31f that expands in a cylindrical shape in the axial direction on the outer side in the radial direction on the inner wall 31b of the housing body part 31 on the other side in the axial direction. The second inner wall part 31f has an annular second step part 31j that extends in the radial direction at the end on one side in the axial direction. The inner diameter of the second inner wall part 31f is larger than the inner diameter of the inner wall 31b of the housing body part 31. Therefore, the thickness of the second inner wall part 31f in the radial direction is smaller than the thickness of the inner wall 31b of the housing body part 31 in the radial direction.

The housing body part 31 has a second caulking part 31h that extends from the end on the front side of the second inner wall part 31f toward the front side. The thickness of the second caulking part 31h in the radial direction is the same as the thickness of the second inner wall part 31f in the radial direction. Further, the valve body 51 of the spool valve 50 is fixed to the housing 30 by the second caulking part 31h.

A terminal cutout part 31i is provided at an end on the plus side in the X axis direction on the front side of the housing body part 31. A terminal body part 37 that holds a terminal 38 electrically connected to the coil 29 protrudes from the inner side of the terminal cutout part 31i in the radial direction toward the outer side. The terminal body part 37 and the bobbin 25 on which the coil 29 is wound are an integrally formed product.

(Yoke 21)

The yoke 21 is positioned on the rear side inside the housing body part 31 and has a first cylindrical part 21a that extends in the axial direction. In the present embodiment, the first cylindrical part 21a has a first through hole 21h that penetrates in the axial direction. The plunger 13 is inserted into the first through hole 21h.

The annular first flange part 21b that protrudes toward the outer side in the radial direction is provided on one side of the first cylindrical part 21a in the axial direction. The outer diameter of the first flange part 21b is larger than the inner diameter of the inner wall 31b of the housing body part 31 and slightly smaller than the inner diameter of the first inner wall part 31c. Therefore, the first flange part 21b can be easily inserted into the first inner wall part 31c. In addition, the first flange part 21b is in contact with the first step part 31e with the first end surface 21d1 of the first flange part 21b on the other side in the axial direction.

In the present embodiment, the first flange part 21b has an annular shape, and the thickness of the first flange part 21b in the axial direction is approximately the same as the thickness of the inner wall 31b of the housing body part 31. Therefore, a first circumferential end part 21c of the first flange part 21b is disposed along the inner surface of the first inner wall part 31c. Thus, the yoke 21 can be disposed in a posture along the central axis J.

The first flange part 21b is in contact with the first step part 31e with the first end surface 21d1 of the first flange part 21b on the other side in the axial direction. Also, the first end surface 21d1 of the first flange part 21b on the other side in the axial direction and the end surface 25c of the bobbin 25 on the other side in the axial direction are located on the same plane.

Figure 3:
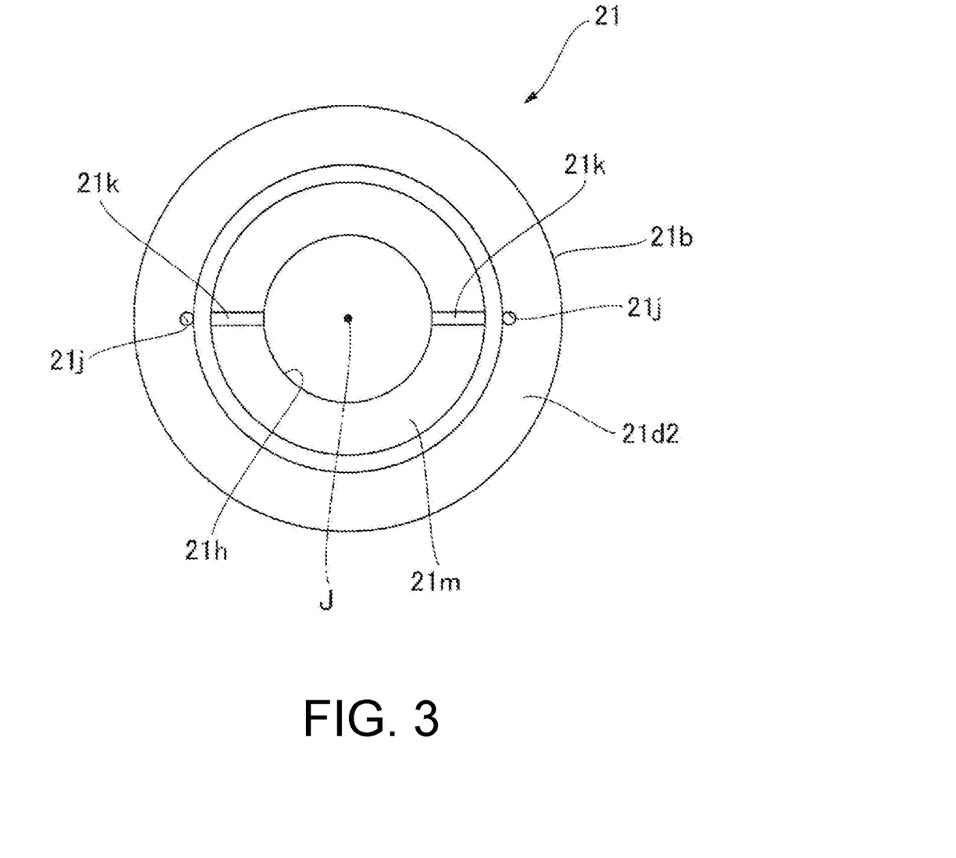
FIG. 3 is a plan view of the yoke.
Figure 4:
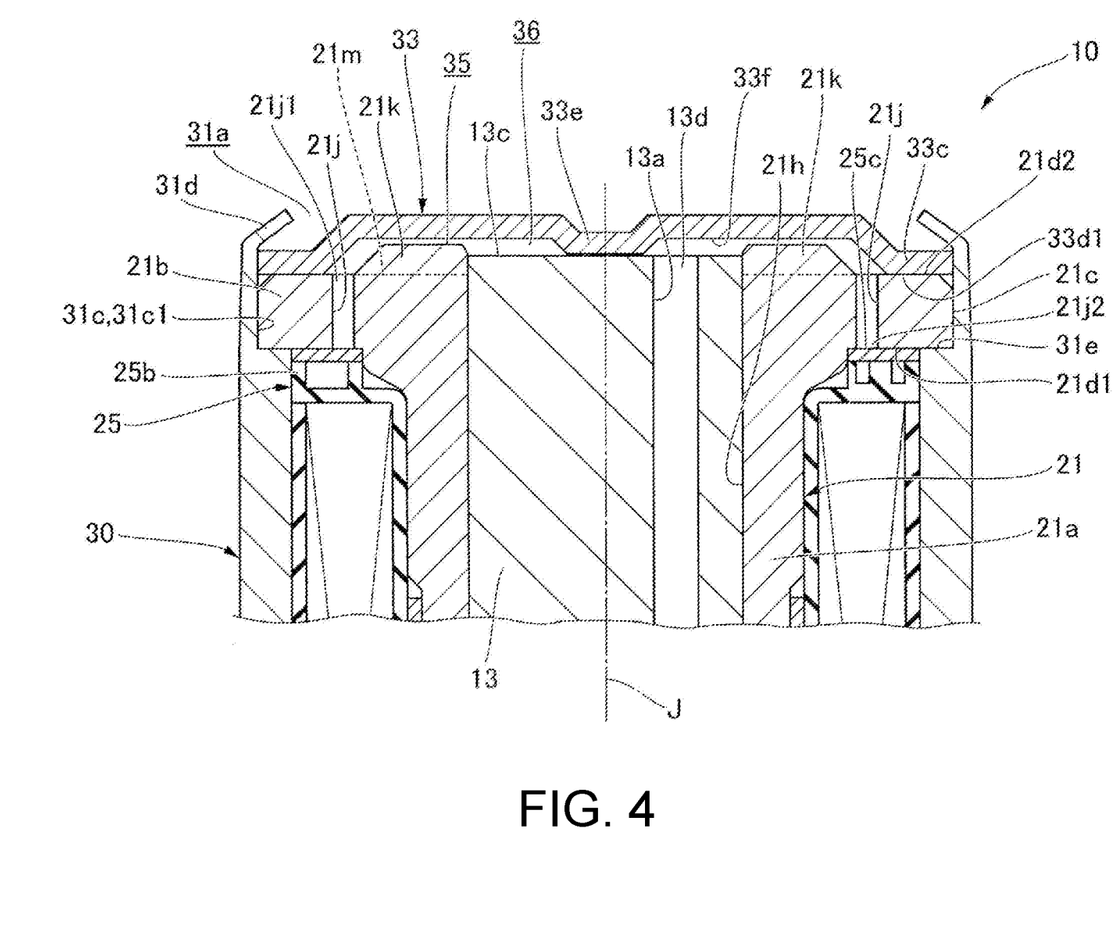
FIG. 4 is a partially enlarged view of the solenoid.

FIG. 3 is a plan view of the yoke 21. FIG. 4 is a partially enlarged view of the solenoid 10. As shown in FIG. 3 and FIG. 4, the first flange part 21b of the yoke 21 has holes 21j that open at least on one side in the axial direction and extend toward the other side in the axial direction. In the present embodiment, the holes 21j penetrate the first flange part 21b. The holes 21j are formed on the inner side of the first flange part 21b in the radial direction and are formed at two positions symmetrical with respect to the central axis J. A fifth opening 21j2, which opens on the other side of the hole 21j in the axial direction, is in contact with the end surface 25c of the bobbin 25 on one side in the axial direction and is closed.

The yoke 21 has a protruding part 21k on a yoke end surface 21m of the yoke 21 on one side in the axial direction. The protruding part 21k protrudes toward one side in the axial direction at a position on the inner side in the radial direction with respect to a sixth opening 21j1, which opens on one side of the hole 21j in the axial direction. The protruding part 21k is positioned so that an end of the protruding part 21k on one side in the axial direction has a gap 35 with the inner surface 33f of the lid 33 on the other side in the axial direction.

As shown in FIG. 2, the length of the first cylindrical part 21a in the axial direction is approximately the same as the length of the plunger 13 in the axial direction. The inner diameter of the first through hole 21h of the first cylindrical part 21a is slightly larger than the outer diameter of the plunger 13. Therefore, the first cylindrical part 21a functions as a slide bearing that supports the plunger 13, and allows the plunger 13 to move in the axial direction.

An end of a wall part 21e of the first cylindrical part 21a on the other side in the axial direction (front side) has an inclined surface part 21f that is inclined obliquely toward the inner side in the radial direction as it goes toward the other side in the axial direction. In addition, a first fitting part 21g that is recessed toward the inner side in the radial direction is provided on a surface on the outer side in the radial direction of the wall part 21e of the first cylindrical part 21a on the other side in the axial direction. A collar 41 (will be described later) is attached to the first fitting part 21g.

The first cylindrical part 21a and the first flange part 21b of the yoke 21 are integrally formed. That is, the first cylindrical part 21a and the first flange part 21b are made of a single member. The yoke 21 is obtained by die molding or cutting. Nevertheless, the first cylindrical part 21a and the first flange part 21b of the yoke 21 may be separate members.

(Plunger 13)

The plunger 13 moves in the axial direction inside the first cylindrical part 21a. In the present embodiment, the plunger 13 is made of a magnetic material and has a columnar shape. The outer diameter of the plunger 13 is slightly smaller than the inner diameter of the first through hole 21h of the first cylindrical part 21a.

The plunger 13 has a second through hole 13a that penetrates in the axial direction. In the present embodiment, the front side of the second through hole 13a opens on the plunger end surface 13b on the front side of the plunger 13 and the rear side opens on the plunger end surface 13c on the rear side of the plunger 13. The second through hole 13a is positioned on the outer side in the radial direction with respect to the shaft 11, as viewed in the axial direction.

(Core 17)

The core 17 is positioned on the other side in the axial direction (front side) with respect to the yoke 21 and has a second cylindrical part 17a that extends in the axial direction. The second cylindrical part 17a has a third through hole 17f that extends in the axial direction for inserting the shaft 11 therein. In the present embodiment, the core 17 is made of a magnetic material and is disposed on the front side of the housing 30 and fixed inside the housing 30. The core 17 is coupled to the yoke 21 via the collar 41 and fixed to the housing 30 in a state of being in contact with the inner surface of the bobbin 25. An annular second flange part 17b that protrudes in the radial direction is provided on the front side of the second cylindrical part 17a of the core 17. The outer diameter of the second flange part 17b is slightly smaller than the inner diameter of the second inner wall part 31f.

A second circumferential end part 17c of the second flange part 17b in the radial direction is in contact with the second inner wall part 31f. Furthermore, a second end surface 17n of the second flange part 17b on one side in the axial direction is in contact with the second step part 31j. Therefore, the core 17 is positioned on one side in the axial direction (rear side) with respect to the housing 30.

A first space 17d, which opens on the rear side and is recessed toward the front side, is provided on the rear side of the second cylindrical part 17a. In the present embodiment, the first space 17d is provided coaxially with the central axis J and has a circular shape, as viewed in the axial direction. The inner diameter of the first space 17d is slightly larger than the outer diameter of the plunger 13. Therefore, the plunger 13 is movable in the axial direction inside the first space 17d.

The first space 17d is provided with an extended space 17e that extends from the front side end of the first space 17d toward the front side. The extended space 17e opens on the rear side and extends toward the front side. The inner diameter of the extended space 17e is smaller than the inner diameter of the first space 17d. An opening 17g on the rear side of the third through hole 17f, through which the shaft 11 passes, opens on the bottom surface on the front side of the extended space 17e. The extended space 17e suppresses pressure change when the air in the first space 17d is compressed by the plunger 13 that moves into the first space 17d. The rear side of the third through hole 17f communicates with the extended space 17e and the front side opens on the end surface 17h on the front side of the second cylindrical part 17a. The shaft 11 movably passes through the third through hole 17f. The third through hole 17f functions as a slide bearing that supports the shaft 11, and allows the shaft 11 to move in the axial direction.

The cylindrical collar 41 is inserted between the yoke outer circumferential surface of the yoke 21 on the other side in the axial direction and the core outer circumferential surface of the core 17 on one side in the axial direction. The yoke 21 and the core 17 are coupled via the collar 41 with a gap 23. In the present embodiment, a cylindrical second fitting part 17i, which has a diameter smaller than that on the front side of the second cylindrical part 17a, is provided on the rear side of the second cylindrical part 17a of the core 17.

The front side of the collar 41 is fitted to the second fitting part 17i. The rear side of the collar 41 is fitted to the first fitting part 21g of the yoke 21. Therefore, the yoke 21 and the core 17 are coupled via the collar 41. The thickness of the collar 41 is smaller than the thickness of the first cylindrical part 21a of the yoke 21. In the present embodiment, the thickness of the collar 41 in the radial direction is smaller than the thickness of the first cylindrical part 21a of the yoke 21 in the radial direction. Thus, it is possible to enlarge the passage through which the magnetic force lines pass. The collar 41 is made of a non-magnetic material.

A cylindrical thin wall part 17j that extends toward the rear side is provided on the outer side of the first space 17d of the second cylindrical part 17a in the radial direction. The thin wall part 17j has an inclined surface part 17k that is inclined toward the inner side in the radial direction as it goes toward one side in the axial direction. The thin wall part 17j having the inclined surface part 17k concentrates the magnetic force lines that extend from the thin wall part 17j toward the side of the plunger 13 and increases the force of pulling the plunger 13 toward the front side when the coil 29 is energized.

(Shaft 11)

As shown in FIG. 2, the shaft 11 moves in the axial direction inside the second cylindrical part 17a. In the present embodiment, the shaft 11 is made of a non-magnetic metal material, and the outer diameter of the shaft 11 is slightly smaller than the inner diameter of the third through hole 17f. An end on the rear side of the shaft 11 protrudes into the first space 17d, and an end on the front side of the shaft 11 protrudes from the end surface 17h on the front side of the core 17. A retaining ring 12 is attached to the rear side of the shaft 11.

When the plunger 13 moves the shaft 11 toward the front side, the retaining ring 12 is at a position in contact with the bottom surface of the extended space 17e before the plunger end surface 13b on the front side of the plunger 13 comes into contact with the bottom surface of the first space 17d. Therefore, when the shaft 11 moves toward the front side, the plunger 13 can be prevented from coming into contact with the bottom surface of the first space 17d.

(Bobbin 25)

The bobbin 25 has a cylindrical shape and is disposed on the outer side of the first cylindrical part 21a and the second cylindrical part 17a in the radial direction. In the present embodiment, the bobbin 25 is made of resin and covers a side surface 21i of the first cylindrical part 21a on the outer side in the radial direction and a side surface 17m of the second cylindrical part 17a on the outer side in the radial direction. The bobbin 25 has a cylindrical part 25a, and a third flange part 25b that is provided on two sides of the cylindrical part 25a in the axial direction and protrudes toward the outer side in the radial direction. The coil 29 is wound on the cylindrical part 25a.

The third flange part 25b on the plus side in the X axis direction extends toward the outer side in the radial direction and is connected to the terminal body part 37. The bobbin 25 with the coil 29 wound thereon is integrally molded of resin together with the terminal body part 37.

(Coil 29)

The coil 29 is wound on the bobbin 25. In the present embodiment, the coil 29 is wound in the circumferential direction along the outer circumferential surface of the cylindrical part 25a of the bobbin 25 on the outer side in the radial direction. Two ends of the coil 29 are electrically connected to the terminal 38 provided in the terminal body part 37.

(Lid 33)

As shown in FIG. 2, the lid 33 is made of a non-magnetic material and is positioned on one side in the axial direction (rear side) with respect to the yoke 21 and the plunger 13. The lid 33 has a disk shape. The outer diameter of the lid 33 is larger than the inner diameter of the inner wall 31b of the housing body part 31 and slightly smaller than the inner diameter of the first inner wall part 31c. Moreover, the first caulking part 31d is bent toward the inner side in the radial direction to be in contact with the circumferential edge part 33c of the lid 33, so that the lid 33 is fixed to the housing 30 with the circumferential edge part 33c in contact with the first end surface 21d2 of the first flange part 21b on one side in the axial direction.

In the present embodiment, as shown in FIG. 2 and FIG. 4, the lid 33 has a lid body part 33a disposed opposite to the plunger end surface 13c of the plunger 13 on one side in the axial direction; an annular inclined part 33b extending from the end of the lid body part 33a on the outer side in the radial direction toward the outer side in the radial direction as it goes toward the other side in the axial direction; and the annular circumferential edge part 33c protruding from the end of the inclined part 33b on the outer side in the radial direction toward the outer side in the radial direction. The lid 33 closes the first opening 31a in a state of being fixed to the housing 30.

The circumferential edge part 33c of the lid 33 is in contact with the first end surface 21d2 of the first flange part 21b on one side in the axial direction, which extends toward the outer side in the radial direction with respect to the sixth opening 21j1 that opens on one side of the hole 21j in the axial direction. Therefore, the sixth opening 21j1 is not closed by the circumferential edge part 33c.

The lid body part 33a has a protrusion 33e that protrudes toward the side of the plunger 13 on the inner side of the lid body part 33a in the radial direction. When the plunger 13 has moved to a retreat position Pb, the protrusion 33e is in contact with the plunger end surface 13c of the plunger 13 on one side in the axial direction. The protrusion 33e is disposed at a position that does not cross a fourth opening 13d, which opens on one side of the second through hole 13a in the axial direction, as viewed in the axial direction. In the present embodiment, the protrusion 33e is in contact with the central part of the plunger end surface 13c on the rear side of the plunger 13 when the plunger 13 has moved to the retreat position Pb, and the protrusion 33e has a size that does not close the fourth opening 13d on the rear side of the second through hole 13a. The protrusion 33e has a circular shape, as viewed in the axial direction.

As shown in FIG. 4, a second space 36, which communicates the second through hole 13a with the holes 21j when the plunger 13 has moved to the retreat position Pb in contact with the lid 33, is provided between the inner surface 33f of the lid 33 on the other side in the axial direction and the plunger 13 and the yoke 21. The second space 36 is a region, which excludes the protruding part 21k and the protrusion 33e from the region surrounded by the inner surface 33f of the lid 33 on the other side in the axial direction, the yoke end surface 21m of the yoke on one side in the axial direction, and the plunger end surface 13c of the plunger 13 on one side in the axial direction, when the plunger 13 has moved to the retreat position Pb. Also, the volume of the second space 36 at the time when the plunger 13 has moved to the retreat position Pb is the same as or larger than the volume of the first space 17d. Since the protruding part 21k of the yoke 21 has the gap 35 with respect to the inner surface 33f of the lid 33, the gap 35 enlarges the region of the second space 36.

<Spool Valve 50>
(Valve Body 51)

As shown in FIG. 1, the valve body 51 has a cylindrical shape and has a plurality of ports 55 through which oil flows in or out. The valve body 51 has a spool hole 53 that extends in the axial direction for inserting the spool valve portion 52. The spool hole 53 penetrates the valve body 51 in the axial direction. A plurality of ports 55 are connected to the spool hole 53. A flange part 54 that protrudes in the radial direction is provided at the rear side end of the valve body 51. The flange part 54 is caulked by the second caulking part 31h provided on the housing body part 31 of the solenoid 10 to be fixed to the housing body part 31.

(Spool Valve Portion 52)

The spool valve portion 52 includes a plurality of large diameter parts 52a each having an outer diameter slightly smaller than the inner diameter of the spool hole 53, and a small diameter part 52b that connects the large diameter parts 52a adjacent to each other in the axial direction and has a smaller diameter than the large diameter parts 52a. By moving the spool valve portion 52 in the axial direction, the large diameter parts 52a open and close the ports 55. A closing member 57 for closing the opening on the front side of the spool hole 53 is inserted into the end on the front side of the valve body 51. A compression spring 60 is disposed between the closing member 57 and the front side end of the spool valve portion 52. Therefore, the spool valve portion 52 is urged toward the rear side by the compression spring 60.

<Method of Assembling the Solenoid 10>

First, as shown in FIG. 1, the yoke 21 is inserted into the housing body part 31 from the first opening 31a that opens on the rear side of the housing body part 31 with the first flange part 21b facing the rear side, and the first end surface 21d1 of the first flange part 21b on the other side in the axial direction is brought into contact with the first step part 31e of the housing body part 31.

After the yoke 21 is inserted, the lid 33 is inserted into the housing body part 31 from the first opening 31a with the protrusion 33e facing the front side. The surface 33d1 on the front side of the circumferential edge part 33c of the lid 33 comes into contact with the first end surface 21d2 on one side in the axial direction on the rear side of the first flange part 21b of the yoke 21. After the lid 33 is inserted, the first caulking part 31d is bent toward the inner side in the radial direction to be in contact with the circumferential edge part 33c of the lid 33, so as to fix the lid 33 to the housing body part 31.

After the lid 33 is fixed, the plunger 13 is inserted into the housing body part 31 from the second opening 31n that opens on the front side of the housing body part 31, and the plunger 13 is inserted into the first through hole 21h of the first cylindrical part 21a of the yoke 21. After the plunger 13 is inserted, the collar 41 is inserted into the housing body part 31 from the second opening 31n and fitted to the first fitting part 21g of the yoke 21.

After the collar 41 is inserted, an assembly 40 obtained by integrating the bobbin 25 and the terminal body part 37 is inserted into the housing body part 31 from the second opening 31n. The bobbin 25 is fixed by fitting the outer circumferential surface of the bobbin 25 to the inner surface of the inner wall 31b of the housing body part 31.

After the assembly 40 is inserted, the core 17 with the shaft 11 inserted therein is inserted into the housing body part 31 from the second opening 31n with the first space 17d facing the rear side, and the collar 41 that extends from the yoke 21 toward the front side is fitted to the second fitting part 17i of the core 17. In addition, the second end surface 17n on one side in the axial direction of the second flange part 17b of the core 17 is brought into contact with the second step part 31j of the Housing Body Part 31, so as to Complete the Assembly of the Solenoid 10.

Nevertheless, the assembling method of the solenoid 10 is not limited to the order described above. In the assembling method described above, the assembly 40 is inserted into the housing body part 31 after the plunger 13 is inserted into the yoke 21. However, the plunger 13 may be inserted into the yoke 21 after the assembly 40 is inserted into the housing body part 31.

<Operation and Effect of the Solenoid Device 1>

Next, the operation and effect of the solenoid device 1 will be described. As shown in FIG. 1, when the coil 29 of the solenoid 10 of the solenoid device 1 is excited, the plunger 13 is attracted toward the side of the core 17 by the magnetic force generated in the coil 29. Therefore, the shaft 11 in contact with the plunger 13 moves toward the front side together with the plunger 13. In addition, when the shaft 11 moves, it moves against the urge of the compression spring 60. Thus, the spool valve portion 52 in contact with the shaft 11 moves toward the front side.

On the other hand, when the coil 29 of the solenoid 10 is in the non-excitation state, the plunger 13 loses the attraction force from the core 17. Therefore, the spool valve portion 52 is moved toward the rear side by the urging force of the compression spring 60 that is directed to the front side. In addition, along with the movement of the spool valve portion 52 toward the rear side, the shaft 11 and the plunger 13 of the solenoid 10 move toward the rear side.

(1) Here, according to the present embodiment, the second space 36, which communicates the second through hole 13a with the holes 21j when the plunger 13 has moved to the retreat position Pb in contact with the lid 33, is provided between the inner surface 33f of the lid 33 on one side in the axial direction and the plunger 13 and the yoke 21. When the plunger 13 moves toward the other side in the axial direction, the air in the first space 17d is compressed by the plunger 13 and moves to the second space 36 via the second through hole 13a. On the other hand, when the plunger 13 moves toward one side in the axial direction (the side of the retreat position Pb), the air in the second space 36 and the holes 21j is compressed by the plunger 13 and moves into the first space 17d via the second through hole 13a. Here, when the plunger 13 moves toward the side of the retreat position Pb, the air in the second space 36 flows toward the side of the first space 17d via the second through hole 13a. However, by forming the holes 21j that communicate with the second space 36, the region of the second space 36 can be enlarged. Therefore, it is possible to suppress the pressure change of rise of the air pressure in the second space 36 when the plunger 13 is moved to the retreat position Pb, and allow the plunger 13 to move smoothly.

(2) Also, the volume of the second space 36 at the time when the plunger 13 has moved to the retreat position Pb is the same as or larger than the volume of the first space 17d. Therefore, when the plunger 13 moves toward the side of the retreat position Pb, the air that flows from the first space 17d into the second space 36 flows into the second space 36, which has a volume the same as or larger than the volume of the first space 17d. Therefore, it is possible to suppress the air pressure of the second space 36 from changing when the plunger 13 is moved to the retreat position Pb.

(3) In addition, the holes 21j penetrate the first flange part 21b in the axial direction. Therefore, a new space communicating with the second space 36 can be provided in the limited space of the solenoid device 1.

(4) Moreover, the fifth opening 21j2 that opens on the other side of the hole 21j in the axial direction is in contact with the end surface 25c of the bobbin 25 on one side in the axial direction and is closed. Therefore, it is possible to prevent the air flowing into the hole 21j from leaking out or prevent the external air from flowing into the solenoid device 1.

(5) Further, the circumferential edge part 33c of the lid 33 is in contact with the first end surface 21d2 of the first flange part 21b on one side in the axial direction, which extends toward the outer side in the radial direction with respect to the sixth opening 21j1 that opens on one side of the hole 21j in the axial direction. Therefore, the lid 33 does not close the sixth opening 21j1 of the hole 21j, and the communication between the second space 36 and the hole 21j can be maintained.

(6) In addition, the yoke 21 has the protruding part 21k on the yoke end surface 21m of the yoke 21 on one side in the axial direction, and the protruding part 21k protrudes toward one side in the axial direction at a position on the inner side in the radial direction with respect to the sixth opening 21j1 of the hole 21j. An end of the protruding part 21k on one side in the axial direction is in contact with the inner surface 33f of the lid 33 on the other side in the axial direction. When the lid 33 is deformed, the protruding part 21k suppresses the deformation of the lid 33, so it is possible to prevent the region of the space around the sixth opening 21j1 from becoming narrow. Therefore, the communication between the second space 36 and the hole 21j can be maintained.

(7) In addition, the lid body part 33a has the protrusion 33e that protrudes toward the side of the plunger 13 on the inner side of the lid body part 33a in the radial direction. Therefore, when the plunger 13 moves toward one side in the axial direction, the plunger end surface 13c of the plunger 13 on one side in the axial direction can come into contact with the protrusion 33e to restrict movement of the plunger 13 toward one side in the axial direction.

(8) Moreover, the protrusion 33e is in contact with the plunger end surface 13c of the plunger 13 on one side in the axial direction when the plunger has moved to the retreat position Pb. Therefore, the plunger 13 can be stopped at the retreat position Pb.

(9) In addition, the protrusion 33e is disposed at a position that does not cross the fourth opening 13d, which opens on one side of the second through hole 13a in the axial direction, as viewed in the axial direction. Therefore, it is possible to prevent the fourth opening 13d from being closed by the protrusion 33e.

(10) Also, the second space 36 is a region, which excludes the protruding part 21k and the protrusion 33e from the region surrounded by the inner surface 33f of the lid 33, the yoke end surface 21m, and the plunger end surface 13c, when the plunger 13 has moved to the retreat position Pb. Therefore, even if the protruding part 21k and the protrusion 33e exist in the solenoid device 1, the second space 36 can be secured.

(11) Furthermore, the lid 33 is made of a non-magnetic material. Therefore, the magnetic force lines that return to the coil 29 through the yoke 21 from the plunger 13 are unlikely to pass through the lid 33. Therefore, it is possible to suppress dispersion of the magnetic circuit.

Although exemplary embodiments of the disclosure have been described above, the disclosure is not limited to these embodiments, and it is possible to make various modifications and changes within the scope of the disclosure. These embodiments and modifications thereof are included in the scope of the disclosure as well as in the scope of the disclosure defined in the claims and its equivalent.

For example, in the embodiment described above, two holes 21j formed in the first flange part 21b of the yoke 21 are arranged at opposite positions with the central axis J at the center. Three or more holes 21j may be formed in the first flange part 21b at intervals in the circumferential direction. Accordingly, the protruding part 21k may be provided on the yoke end surface 21m on the inner side in the radial direction of the holes 21j formed at three or more positions.

What is claimed is:

1. A solenoid device for moving a shaft in an axial direction with a magnetic force generated by excitation of a coil, the solenoid device comprising:
a yoke comprising a first cylindrical part that extends in the axial direction;
a core positioned on the other side in the axial direction with respect to the yoke and comprising a second cylindrical part that extends in the axial direction;
the shaft moving in the axial direction inside the second cylindrical part;
a bobbin disposed on an outer side of the first cylindrical part and the second cylindrical part in a radial direction;
the coil wound on the bobbin;
a plunger moving in the axial direction inside the first cylindrical part;
a lid positioned on one side in the axial direction with respect to the yoke and the plunger; and
a housing housing the shaft, the yoke, the core, the bobbin, the coil, the plunger, and the lid,
wherein the housing comprises a cylindrical housing body part, and
the housing body part comprises:

a first opening that opens at an end on one side in the axial direction; and a first inner wall part that is adjacent to the first opening and expands in a cylindrical shape in the axial direction on the outer side in the radial direction on an inner wall of the housing body part on one side in the axial direction, wherein the first inner wall part comprises an annular first step part that extends in the radial direction at an end on the other side in the axial direction, the first cylindrical part of the yoke comprises an annular first flange part that protrudes toward the outer side in the radial direction on one side of the first cylindrical part in the axial direction, the lid has a disk shape and comprises an annular circumferential edge part that extends toward the outer side in the radial direction, the yoke and the lid are fixed to the housing in a state where a first end surface of the first flange part on the other side in the axial direction is in contact with the first step part of the housing body part, and a surface on the other side in the axial direction of the circumferential edge part of the lid is in contact with a first end surface of the first flange part on one side in the axial direction, the second cylindrical part of the core has a first space, which opens on one side in the axial direction and is recessed toward the other side in the axial direction for inserting or removing the plunger that moves, the plunger has a second through hole that penetrates along the axial direction, the second through hole has a third opening that opens on the other side of the second through hole in the axial direction and is positioned on the outer side in the radial direction with respect to the shaft, as viewed in the axial direction, the first flange part of the yoke has a hole that opens at least on one side in the axial direction and extends toward the other side in the axial direction, and a second space, which communicates the second through hole with the hole when the plunger has moved to a retreat position in contact with the lid, is provided between an inner surface of the lid on the other side in the axial direction and the plunger and the yoke.

2. The solenoid device according to claim 1, wherein a volume of the second space at a time when the plunger has moved to the retreat position is the same as or larger than a volume of the first space.

3. The solenoid device according to claim 1, wherein the hole penetrates the first flange part in the axial direction.

4. The solenoid device according to claim 3, wherein a fifth opening, which opens on the other side of the hole in the axial direction, is in contact with an end surface of the bobbin on one side in the axial direction and is closed.

5. The solenoid device according to claim 1, wherein the lid comprises:

a lid body part disposed opposite to a plunger end surface of the plunger on one side in the axial direction;

an annular inclined part extending from an end of the lid body part on the outer side in the radial direction toward the outer side in the radial direction as the inclined part goes toward the other side in the axial direction; and the annular circumferential edge part protruding from an end of the inclined part on the outer side in the radial direction toward the outer side in the radial direction, wherein the circumferential edge part of the lid is in contact with the first end surface of the first flange part on one side in the axial direction, which extends toward the outer side in the radial direction with respect to a sixth opening that opens on one side of the hole in the axial direction.

6. The solenoid device according to claim 5, wherein the yoke comprises a protruding part on a yoke end surface of the yoke on one side in the axial direction, and the protruding part protrudes toward one side in the axial direction at a position on an inner side in the radial direction with respect to the sixth opening of the hole, and the protruding part is positioned so that an end of the protruding part on one side in the axial direction has a gap with the inner surface of the lid on the other side in the axial direction.

7. The solenoid device according to claim 6, wherein the lid body part comprises a protrusion that protrudes toward the side of the plunger on the inner side of the lid body part in the radial direction.

8. The solenoid device according to claim 7, wherein the protrusion is in contact with the plunger end surface of the plunger on one side in the axial direction when the plunger has moved to the retreat position.

9. The solenoid device according to claim 8, wherein the protrusion is disposed at a position that does not cross a fourth opening, which opens on one side of the second through hole in the axial direction, as viewed in the axial direction.

10. The solenoid device according to claim 7, wherein the second space is a region, which excludes the protruding part and the protrusion from a region surrounded by the inner surface of the lid on the other side in the axial direction, the yoke end surface of the yoke on one side in the axial direction, and the plunger end surface of the plunger on one side in the axial direction, when the plunger has moved to the retreat position.

11. The solenoid device according to claim 1, wherein the lid is made of a non-magnetic material.

* * * * *